United States Patent [19]

Greenawalt et al.

[11] 4,091,842
[45] May 30, 1978

[54] RESEALABLE SEALING ASSEMBLY FOR INSPECTION PORT HOLE

[75] Inventors: Eddie L. Greenawalt; Charles M. Whitaker, both of Lake Jackson, Tex.

[73] Assignee: The Dow Chemical Company, Midland, Mich.

[21] Appl. No.: 819,809

[22] Filed: Jul. 28, 1977

[51] Int. Cl.² ............................................. F16L 55/10
[52] U.S. Cl. ........................................ 138/90; 220/307
[58] Field of Search ........................ 220/307; 215/355; 138/89, 90; 217/98

[56] References Cited

U.S. PATENT DOCUMENTS

| | | | |
|---|---|---|---|
| 3,233,775 | 2/1966 | Bozek | 220/307 |
| 3,658,096 | 4/1972 | Higuera | 138/90 |
| 3,827,462 | 8/1974 | Celesta | 138/90 |

Primary Examiner—George T. Hall

[57] ABSTRACT

A resealable sealing assembly for inspection port holes cut through the insulation of insulated surfaces is provided by the method and apparatus of this invention. The resealable sealing assembly is comprised of a rigid sleeve permanently installed in the insulation port hole and a removable plug made of compressible elastomeric material which, when inserted in the rigid sleeve, forms weatherproof seals at two separate surface areas between the plug and the sleeve. The resealable sealing assembly is applicable for use in a wide variety of textures of insulation from very soft and flimsy to hard.

5 Claims, 6 Drawing Figures

RESEALABLE SEALING ASSEMBLY FOR INSPECTION PORT HOLE

BACKGROUND OF THE INVENTION

Safety precautions as well as legal duties require many types and shapes of vessel surfaces to be periodically inspected for such problems as deterioration of wall thickness. Often these surfaces are insulated, requiring under present practice that inspection holes be cut through the insulation prior to each inspection and reclosed after each inspection. This laborious and costly operation could be simplified by the use of permanently cut inspection holes. Permanently cut inspection holes are usually not installed under present practice because satisfactory devices are not available which provide an acceptable weatherproof seal in the periods between inspections, which are easily installed and removed by inspectors, and which are applicable for a wide range of insulation consistencies ranging from the very soft types such as glass fibers to the hard types such as those made from silicates.

A practical, economical and dependable resealable sealing device for inspection port holes cut permanently in insulation is achieved by the present invention.

SUMMARY OF THE INVENTION

This invention is a resealable sealing assembly located in a cylindrically shaped inspection hole cut in skin-covered insulation. It is comprised of two basic parts: (1) an essentially rigid, cylindrically shaped sleeve and (2) a cylindrically shaped plug made from an elastomeric material.

The plug is hollow except for a diaphragm connecting its interior wall to prevent fluid passage through the interior of the plug. The diaphragm is located at any convenient location along the interior of the plug wall. The plug has an annular lip which extends outwardly from the top of the plug wall. This lip's downward side is concavely curved upward with a predetermined radius. The plug has an annular cleat protruding outwardly from the side of the plug wall at a predetermined distance from the top of upward curve of the bottom of the annular plug lip. This annular cleat has a diameter which is also predetermined.

The rigid sleeve has an annular lip extending outwardly from the top of the sleeve. The bottom part of this lip is capable of being attached to the external surface of the insulation skin surrounding the hole cut in the insulation by an adhesive-sealant when the sleeve (excluding the sleeve lip) is slipped into the hole cut in the skin-covered insulation. The hole in the skin-covered insulation is cut to a diameter sufficient to just receive the sleeve but not large enough to receive the sleeve lip. A weatherproof seal as well as a first anchoring connection between the sleeve and insulation skin is thus formed by connecting the bottom side of the sleeve lip to the insulation-skin with the adhesive-sealant. This first anchoring connection is present to stabilize the sleeve with respect to the insulation and insulation skin.

The lip of the sleeve has a convex-upwardly curved portion on its upper side. This curved portion has a radius of curvature sufficiently larger than the radius of curvature of concave-upwardly curved downward side of the plug lip so that the plug lip is sufficiently stretched over and around this curved portion of the sleeve lip to cause a first surface-to-surface seal to be formed between the plug and the sleeve when the plug lip and sleeve lip are mated.

The sleeve also has an enlarged annular bulge formed in its wall after the sleeve is inserted into the insulation so that the sleeve wall is caused to protrude sufficiently outwardly into the insulation surrounding the sleeve in order to form a second anchoring connection between the sleeve and insulation by compression of the surrounding insulation. This annular bulge is located down the sleeve wall at a distance from the top of the curved sleeve lip which is sufficiently more than the predetermined distance between the plug cleat and the top of the upward curve of the bottom of the plug lip so that when the plug cleat is positioned in the sleeve annular bulge, the plug wall and plug lip are in sufficient tension so as to cause the plug lip's curved surface to be so stretched when it is mated with the sleeve lip so as to form a first surface-to-surface seal between the plug and the sleeve. Also the inside diameter of the sleeve's annular bulge is sufficiently less than the outside diameter of the plug cleat so that with the plug cleat positioned into the annular bulge of the sleeve a second surface-to-surface seal is formed between the sleeve and the plug due to the compression of the plug cleat within the sleeve annular bulge.

DETAILED DESCRIPTION OF THE PREFERRED EMBODIMENT

Figure 1:
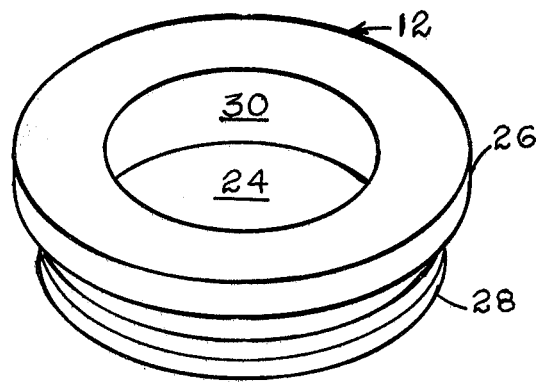
FIG. 1 is a perspective view of the cylindrically shaped, elastomeric plug of the sealing assembly of this invention.
Figure 2:
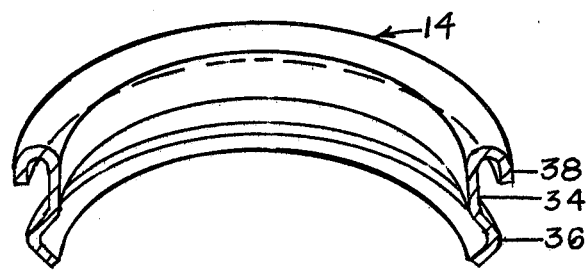
FIG. 2 is a perspective, sectional view of the rigid, cylindrically shaped, hollow sleeve of the sealing assembly of this invention.

Corresponding and like parts are indicated in the figures of the drawings, and referred to in the following written description by the same numerical reference characters.

Referring to the drawings, FIGS. 1–6 show various views and stages of installation of the most preferred embodiment of the insulation inspection hole resealable sealing assembly of this invention. This assembly will be referred to by reference character 10.

Figure 3:
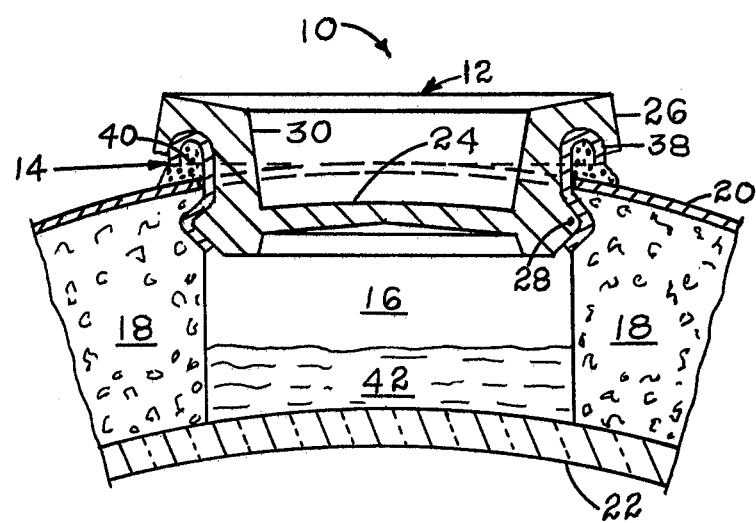
FIG. 3 is a side view, taken in cross-section, of an assembly of this invention shown installed in a port hole cut in the insulation protecting a curved surface.

In essence, assembly 10 is comprised of: (a) an essentially cylindrically shaped plug which will be referred to by reference character 12 and (b) a rigid, essentially cylindrically shaped hollow sleeve which will be referred to by reference character 14. Plug 12 can be easily seen in FIG. 1 and sleeve 14 can be easily seen in FIG. 2. FIG. 3 shows assembly 10 installed as it is intended to be used; i.e. sealing an inspection hole 16 cut in insulation 18 and insulation protective covering 20, which insulation 18 and covering 20 is shown protecting surface 22. (Insulation protective covering 20 is herein also referrred to as "skin" or "insulation skin.")

To more easily appreciate the features of assembly 10 as it appears in FIG. 3, discussion of its parts, plug 12 and sleeve 14, will first be made of these parts as they appear in FIGS. 4–6.

A. THE PLUG

Figure 4:
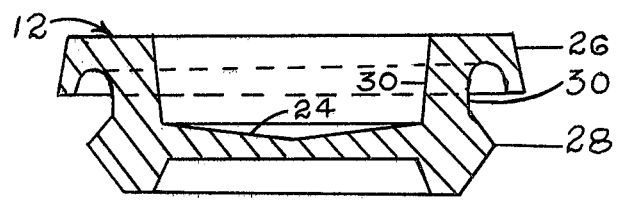
FIG. 4 is a side view, taken in cross-section, of the elastomeric plug of the sealing assembly before it is installed in the sleeve of the assembly.

Referring to FIG. 4, plug 12 is seen to be essentially a hollow shaped one-piece cylinder having a diaphragm 24, annular lip 26, and annular cleat 28. As shown here plug 12 is molded into a single piece from an elastomeric material, such as Silastic$^{TM}$ silicon rubber. The outside diameter of plug wall 30 between lip 26 and cleat 28 is sufficiently small so as to fit within sleeve 14. It is not necessary that this portion of plug wall 30 be capable of contacting the corresponding portion of the interior of sleeve wall 34 when plug 12 is in place in sleeve 14 (see FIG. 3), for this part of plug wall 30 and sleeve wall 34 are not relied upon to form the weatherproof seals of this assembly.

The purpose of diaphragm 24 is to prevent passage of moisture or air through the interior of plug 12. It can be located at any convenient location along the interior of side wall 30 of plug 12. The plug 12 is more easily inserted and withdrawn from sleeve 14 (see FIG. 3) when the diaphragm 24 is located near the bottom of plug 12. Diaphragm 24 is shown as being tapered toward its center on its upper surface. This is not critical. The taper's purpose is to conserve material from which the plug is molded, and to facilitate removal of the plug from its mold.

Annular lip 26 extends outwardly from the top of side wall 30 of plug 12 in a direction generally perpendicular to plug side wall 30. The size and shape of the top of lip 26 is not important. The size and shape of at least a portion of the downward side of lip 26 of plug 12 is very important, however, for this is one of the sealing surfaces of assembly 10. The downward side of lip 26 is concavely curved upward with a predetermined radius of curvature.

Annular cleat 28 protrudes outwardly from plug wall 30. Preferably cleat 28 is located near the bottom of plug wall 30. It is important that cleat 28 be formed with a predetermined diameter so that it can form another sealing surface between plug 12 and sleeve 14 when plug 12 is inserted into sleeve 14 as shown in FIG. 3. The shape of cleat 28 is not critical as it will be deformed by compression into a sealing surface when it is inserted into the annular bulge 36 in sleeve 14 (see FIG. 3). This compression will be further discussed below.

Elastomeric materials suitable for use in making plug 12 are those having a durometer as measured on Shore "A" scale of from about 20 to about 60, preferably a durometer of from about 30 to about 50, and more preferably having a durometer of from about 35 to about 45. Examples of suitable elastomeric materials are Silastic$^{TM}$ silicon rubbers, flexible polyurethane, Viton$^{TM}$, Neoprene, and other synthetic rubbers.

B. THE SLEEVE

Figure 5:
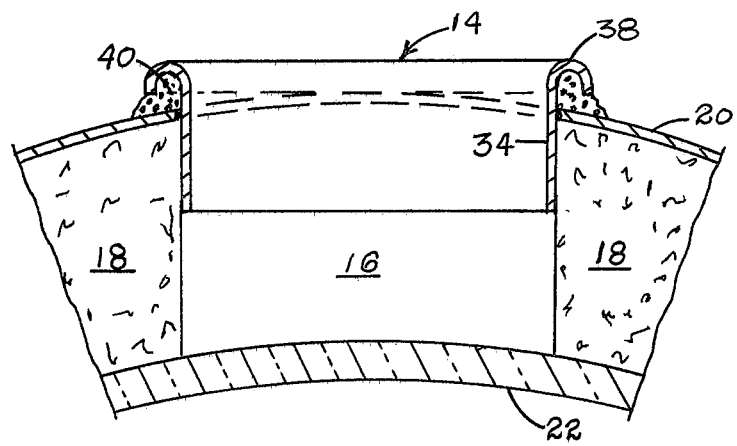
FIG. 5 is a side view, taken in cross-section, of the rigid sleeve of the sealing assembly shown incompletely installed in a port hole cut in the insulation protecting a curved surface, without the annular bulge being formed in the sleeve wall.
Figure 6:
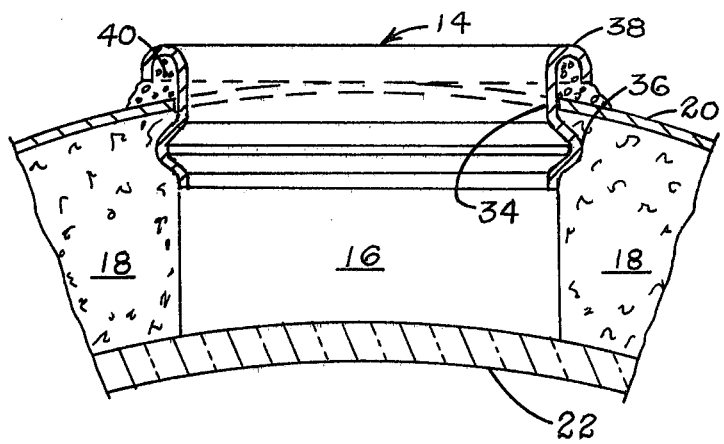
FIG. 6 is a side view, taken in cross-section of the sleeve of FIG. 5 after it has been completely installed in the port hole, with the annular bulge formed, ready to receive the elastomeric plug of FIG. 4.

Sleeve 14 of assembly 10 can better be illustrated by referring to FIGS. 5 & 6. FIG. 6 illustrates the finished sleeve 14 while FIG. 5 illustrates a step in the installation of sleeve 14.

Referring to FIG. 5, sleeve 14 is shown inserted into a hole 16 cut through insulation protective covering 20 and insulation 18 down to surface 22. Hole 16 can be cut by a cutting means such as a hole saw. Hole 16 is cut to a diameter which will allow unfinished sleeve 14, as it appears in FIG. 5, to be slipped into said hole 16 to form a substantially snug fit between the exterior of sleeve walls 34 and insulation 18. Sleeve 14 is made of a substantially rigid, ductile material which is preferably cold-formable such as is aluminum.

In FIG. 5, sleeve 14 can be seen to be essentially a hollow cylinder which has an annular lip 38 extending outwardly from the top of sleeve wall 34. The inside diameter of sleeve wall 34 is about the same, or slightly smaller, than the outside diameter of that portion of plug wall 30 lying between plug lip 26 and plug cleat 28.

There is an annular lip 38 extending outwardly from the top of sleeve 14 which can not enter hole 16. The size and shape of the upper side of sleeve lip 38 is important inasmuch as when plug 12 is positioned in sleeve 14, one of the two seals formed between plug 12 and sleeve 14 is formed between this upper side of sleeve lip 38 and the curved underside of plug lip 26. The upper side of sleeve lip 38 is convexly curved upward with a predetermined radius of curvature. This radius of curvature is greater than the radius of curvature of the concavely curved downward side of plug lip 26. This mismatching of the radii of curvatures of these two surfaces is done so that a better seal will be formed between them when plug 12 is positioned in sleeve 14. This better seal is formed by causing elastomeric plug lip 26 to be stretched tightly around rigid sleeve lip 38 when the assembly 10 is in use in place as in FIG. 3. How the stretching of plug lip 26 is achieved and maintained will be discussed below.

The shape of the bottom portion of sleeve lip 38 is not critical, although a curved surface is preferred. It merely must be capable of being attached to insulation protective covering 20 such as by a sealant forming adhesive. In this embodiment of assembly 10, the underside of sleeve lip 38 is curved along with upper side of lip 38.

A weatherproof, adhesive-sealant 40 bonds sleeve lip 38, and thus sleeve 14, to insulation protective covering 20. This bonding forms a permanent weatherproof seal between sleeve lip 38 and insulation protective covering 20 which prevents fluids such as air and water from penetrating into insulation 18 and surface 22 between the external side of sleeve wall 34 and the cut edge of insulation protective covering 20. This bonding of adhesive-sealant 40 also performs a second important function. It forms a first anchoring connection between sleeve 14 and insulation 18 by being permanently affixed to insulation protective covering 20 which is affixed to insulation 18.

After insertion of unfinished sleeve 14 into hole 16 as shown in FIG. 5 an annular bulge 36 is formed in sleeve wall 34 and is shown in FIG. 6. This bulge 36 can be formed by any of several means. Preferably the material from which sleeve 14 is made can be cold-formed.

Using materials which are cold formable has the advantage of being able to use hand tools and low temperatures in forming annular bulge 36. Such an advantage is particularly good for use of sealing assembly 10 in zones where no sparks or fires are permitted. Of course, in zones where there are no such restrictions, materials such as rigid thermoplastics can be used for sleeve 14 since annular bulges 36 can be formed in such plastics by the application of heat and pressure at the location on the sleeve side wall 34 at which it is desired to form annular bulge 36.

An important reason for having annular bulge 36 is that it further anchors sleeve 14 into a permanent position with respect to insulation 18. One of the advantages achieved by this invention is that it provides an inspection hole sealing assembly which is not only resealable but which can be used with a wide variety of insulations. This is attributable in no small part to the squeezing of an annular indentation into insulation 18 by the formation of annular bulge 36. By swaging sleeve wall 34 out into insulation 18 when forming annular bulge 36, the insulation 18 immediately surrounding bulge 36 is compressed. This compressed insulation 18, especially that compressed in the region between annular bulge 36 and protective coating 20, exerts an external force on annular bulge 36 which tends to further anchor sleeve 14 in a permanent position with respect to insulation 18. Thus, there are, in effect, two anchoring connections between sleeve 14 and insulation 18, i.e. the one just discussed and the adhesive bond formed between the sleeve lip 38 and insulation protective covering 20 discussed above.

It is very important that the weatherproof seal formed by adhesive sealant 40 not be cracked to break its weatherproof seal between sleeve lip 38 and covering 20. Thus sleeve 14 needs to be firmly fixed in position to resist movement with respect to insulation 18 when it undergoes the forces exerted on it when plug 12 is inserted and removed. The combination of the two anchoring connections provides this permanency of position even in insulation as flimsy as glass fiber.

Another important function of annular bulge 36 is to provide a surface to surface weatherproof seal between plug 12 and sleeve 14 when plug 12 is positioned in sleeve 14 as shown in FIG. 3. The formation of this surface-to-surface seal is accomplished by having the interior diameter of sleeve annular bulge 36 sufficiently smaller than the outside diameter of plug cleat 28. Thus when elastomeric plug 12 is positioned in rigid sleeve 14, cleat 28 is sufficiently deformed as it is compressed within annular bulge 36 so that its surface tightly mates with the interior surface of annular bulge 36.

The location of annular bulge 36 along sleeve wall 34 with respect to its distance from the top of sleeve lip 38 is important. This distance should be more than the distance between plug cleat 28 and the top of the curve of the downward side of plug lip 26. By having these two distances so related, the positioning of plug cleat 28 into annular bulge 36 causes plug wall 30 to pull downward on plug lip 26 which in turn causes the curved downward side of plug lip 26 to be stretched around the larger curved surface of the upper side of sleeve lip 38. This stretching of plug lip 26 around sleeve lip 38 causes there to be formed a second surface-to-surface seal between plug 12 and sleeve 14.

A very stable weatherproof overall seal is formed between plug 12 and sleeve 14 by having present the combination of these two surface-to-surface seals between plug 12 and sleeve 14; i.e. (1) the seal formed by compressing plug cleat 28 into sleeve annular bulge 36 and (2) the seal formed by stretching plug lip 26 around and over sleeve lip 38.

Referring to FIG. 3, assembly 10 is seen in place in inspection hole 16 sealing off both the insulation 18 and surface 22 from the atmosphere located above assembly 10 and protective covering 20. Sleeve lip 38 of rigid sleeve 14 has been bonded to insulation protective covering 20 by adhesive 40 to form a first anchoring connection between sleeve 14 and insulation 18 and simultaneously to form a weatherproof seal between the external wall of sleeve 14 and insulation protective surface 20.

Annular bulge 36 of sleeve wall 34 has been swaged outward into insulation 18 to compress it to form a second anchoring connection between sleeve 14 and insulation 18. Annular bulge 36 has an inside diameter which is smaller than does elastomeric plug cleat 28 when plug cleat 28 is not compressed. Plug cleat 28 is shown compressed into sleeve annular bulge 36 to form a surface-to-surface seal between plug 12 and sleeve 14. Annular bulge 36 is located at a predetermined distance below the top of curved sleeve lip 38. Curved sleeve lip 38, which has a radius of curvature greater than the normal radius of curvature of the curved underside of plug lip 26, is shown here with plug lip 26 stretched around it by the pull exerted on it by plug side wall 30. The distance between the curved top of rigid sleeve lip 38 and rigid sleeve annular bulge 36 is greater than the unstretched distance between plug cleat 28 and the top of the curve of the curved underside of plug lip 26. The forcing of annular plug cleat 28 into sleeve annular bulge 36 forces a pull on plug wall 30 and thus on plug lip 26. This pull causes plug lip 26 to stretch around sleeve lip 38 to form the second seal between plug 12 and sleeve 14.

Plug diaphragm 24 extends across the otherwise hollow interior of plug 12, being integrally connected with plug annular side wall 30 to prevent the passage of any fluid such as water or air through plug 12.

Plus 12 can be easily removed by hand from sleeve 14 by grasping elastomeric plug lip 26 and forcefully pulling it out. This would allow an inspection to then be made of surface 22 and/or insulation 18 through hole 16. Plug 12 can then be squeezed and manipulated by hand back into sleeve 14 restoring both of the weatherproof seals between sleeve 14 and plug 12 thereby once again forming an overall weatherproof seal for inspection hole 16. This removal and reinsertion of plug 12 from and into sleeve 14 can be repeated many times over a long period of time without loosing the sealing capability of the assembly 10 for the inspection hole 16.

If desired, a layer of free insulation 42 may be interposed in hole 16 between assembly 10 and surface 22. There are several reasons why this might be done, one of which is to protect plug 12 from severely high temperatures of surface 22 causing unacceptably high temperatures for plug 12.

We claim:

1. A resealable sealing assembly located in a cylindrically shaped inspection hole cut in skin-covered insulation, said assembly being comprised, in combination, of:
   a. a cylindrically shaped plug made from an elastomeric material,
   which plug is hollow except for a diaphragm connecting the interior wall of the plug to prevent fluid passage through the interior the plug, the diaphragm being located at any convenient location along the interior of the plug wall,
   which plug has an annular lip which extends outwardly from the top of the plug wall and which lip's downward side is concavely curved upward with a predetermined radius,
   which plug has an annular cleat protruding outwardly from the side the plug side wall at a predetermined distance from the top of the upward curve of the bottom of the annular plug lip, and which cleat has a predetermined diameter; and b. a rigid cylindrically shaped, hollow sleeve into and over which the elastomeric plug is capable of being positioned, said sleeve having an annular lip extending outwardly at the sleeve top and an annular bulge protruding outwardly in the sleeve wall, said sleeve being located within the hole cut in the insulation with the exception of the sleeve lip which extends outwardly from the top of the sleeve over that skin-covered insulation which immediately surrounds the hole, the bottom of the sleeve lip being attached to the top of the skin-covered insulation by an adhesive-sealant forming both a weatherproof seal and a first anchoring connection between the sleeve and the insulation, the sleeve lip having a convex-upwardly curved portion on its upper side, which curved portion has a radius of curvature greater than the radius of curvature of the concave-upwardly curved downward side of the plug lip so that the elastomeric plug lip is stretched sufficiently around the convex-upwardly curved portion of the rigid sleeve lip to form a first surface-to-surface seal between the plug and the sleeve when the plug is in position in and over the sleeve, the enlarged annular bulge of the sleeve formed in the sleeve wall protruding sufficiently outwardly into the insulation surrounding the sleeve wall to form a second anchoring connection between the sleeve and the insulation by compression of the insulation adjacent to the annular bulge, said compression causing compression forces to be exerted on the sleeve by the insulation to assist in holding the sleeve stationery with respect to the insulation, the annular bulge having an inside diameter sufficiently less than the outside diameter of the plug cleat so that when the plug cleat is in position in the sleeve annular bulge a second surface-to-surface seal is formed between the sleeve and the plug due to the compression of the plug cleat within the sleeve annular bulge, the location of the annular bulge being down the sleeve wall at a distance from the top of the curved sleeve lip at a distance which is sufficiently greater than the distance between the plug cleat and the top of the curve in the bottom of the plug lip so that when the plug cleat is in position in the sleeve annular bulge there exists sufficient tension in that part of the plug wall located between the plug cleat and plug lip to cause the plug lip's curved surface to be stretched around the sleeve lip's curved surface to form the aforementioned first surface-to-surface seal between the plug and the sleeve.

2. An assembly as recited in claim 1 wherein the material from which the sleeve is made is cold-formable.

3. The assembly of claim 2 wherein the cold-formable material is malleable metal.

4. The assembly of claim 1 wherein the hardness of the elastomeric plug is from about 20 durometer to about 60 durometer as measured on Shore "A" scale.

5. The assembly of claim 1 wherein the hardness of the elastomeric plug is from about 30 durometer to about 50 durometer as measured on Shore "A" scale.

* * * * *